M. C. SMITH.
ROTARY CUTTER.
APPLICATION FILED MAY 17, 1906.

906,318.

Patented Dec. 8, 1908.

Witnesses
J. A. Griesbauer Jr.
C. H. Griesbauer.

Inventor
M. C. Smith
by H. B. Willson & Co.
Attorneys

UNITED STATES PATENT OFFICE.

MALISSA C. SMITH, OF DUPONT, OHIO.

ROTARY CUTTER.

No. 906,318.　　　Specification of Letters Patent.　　　Patented Dec. 8, 1908.

Application filed May 17, 1906. Serial No. 317,358.

*To all whom it may concern:*

Be it known that I, MALISSA C. SMITH, a citizen of the United States, residing at Dupont, in the county of Putnam and State of Ohio, have invented certain new and useful Improvements in Rotary Cutters; and I do declare the following to be a full, clear, and exact description of the invention, such as will enable others skilled in the art to which it appertains to make and use the same.

My invention relates to improvements in rotary cutters for use in cutting noodles and for other purposes.

The object of the invention is to provide a simple, practical and efficient tool of this character, in which the rotary cutting disks may be quickly and easily adjusted toward and from each other to vary the size of the strips cut.

With the above and other objects in view, the invention consists of certain novel features of construction, combination and arrangement of devices hereinafter described and claimed.

Figure 1:
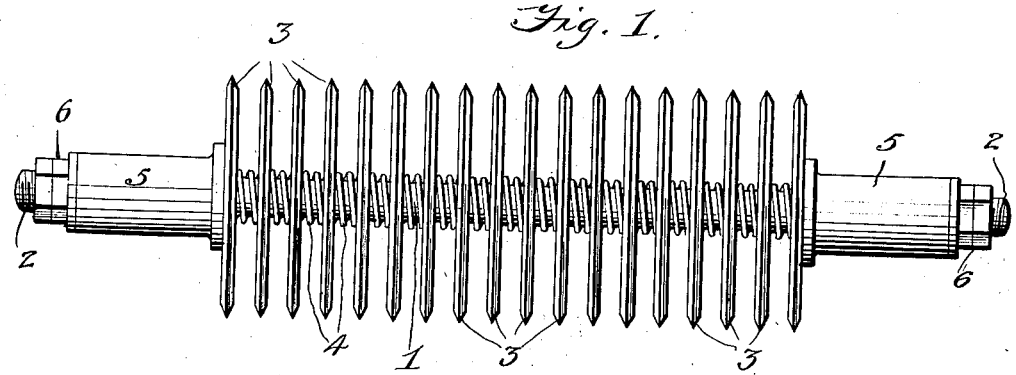
Figure 2:
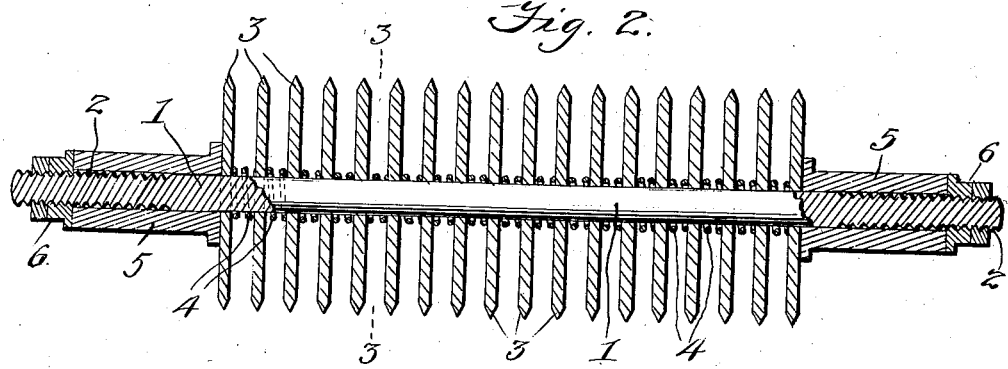
Figure 3:
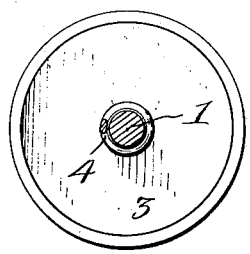

In the accompanying drawings,—Figure 1 is a side elevation of my improved noodle cutter; Fig. 2 is a longitudinal sectional view through the same; and Fig. 3 is a vertical transverse sectional view.

Referring to the drawing by numeral, 1 denotes a straight rod of cylindrical form, which has its ends externally screw-threaded, as shown at 2, and which has slidably and adjustably mounted upon its central portion, a plurality of revoluble cutting disks 3, of uniform size, but of any desired form and construction and beveled on both sides to form sharp cutting edges which penetrate the dough and cut it into strips without danger of the strips adhering to the blades or disks and thereby avoiding the necessity of using auxiliary means for preventing such sticking. These cutters have concentric openings through which the rod 1 slides, and they are spaced apart by coil springs 4, which surround the rod between their opposite faces. These springs are all of equal strength, so that the cutters will be held at equal distances apart to cut noodles or strips of sheet material of uniform size.

The tool is operated similar to a rolling pin by grasping the rotary handles 5 provided upon its opposite ends, and here shown in the form of cylindrical sleeves, the inner ends of which engage the outer faces of the outermost cutter disks 3. These handles are retained upon the rod 1 and the cutter disks are adapted to be adjusted toward and from each other by means of a nut or nuts 6, screwed upon the threaded ends 2 of the rod 1, as clearly shown in Fig. 2 of the drawings.

It will be seen that when the nuts 6 are screwed inwardly or toward each other, the handle sleeves 5 and the cutters 3 will be moved toward each other, and since the coil springs 4 are all of equal strength, the cutters 3 will adjust themselves upon the rod 1, so that they will be an equal distance from each other and will be held in a central position upon said rod. By thus adjusting the nuts, noodles or strips of sheet material of any description may be cut of any desired uniform width. By the use of these independently-revoluble, longitudinally-slidable handles 5, the rod ends may be screwthreaded a sufficient distance to permit adjustment of the disks without having the ends 2 extend an undesirable distance beyond the handles.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention, as defined by the appended claim.

Having thus described my invention, what I claim as new, and desire to secure by Letters-Patent, is,—

In combination with an arbor, a plurality of cutting disks mounted thereon, resilient means to hold the disks in spaced relation and sleeves on opposite ends of the arbor, said sleeves both being removable and adjustable toward and from the center of the arbor whereby the cutting disks may be removed from either end of the arbor and the disk bearing portion held substantially in the center of the arbor though varied in length.

In testimony whereof I have hereunto set my hand in presence of two subscribing witnesses.

MALISSA C. SMITH.

Witnesses:
　G. G. McCoy,
　TIZBEE SMITH.